United States Patent
Kamenetz et al.

(10) Patent No.: US 9,772,615 B2
(45) Date of Patent: Sep. 26, 2017

(54) MULTI-CHANNEL CONTROL SWITCHOVER LOGIC

(71) Applicant: Hamilton Sundstrand Corporation, Windsor Locks, CT (US)

(72) Inventors: Jeffry K. Kamenetz, Windsor, CT (US); James A. Gosse, Storrs, CT (US); Joseph T. Gostkowski, Cromwell, CT (US); Richard L. Bue, West Hartford, CT (US); Mark A. Johnston, Windsor, CT (US); James Peter Wivell, Southington, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1179 days.

(21) Appl. No.: 13/887,561

(22) Filed: May 6, 2013

(65) Prior Publication Data

US 2014/0330397 A1 Nov. 6, 2014

(51) Int. Cl.
*G05B 19/042* (2006.01)
*G05B 9/03* (2006.01)
*G06F 11/20* (2006.01)
*G06F 11/16* (2006.01)
*G05B 15/02* (2006.01)

(52) U.S. Cl.
CPC ............ *G05B 19/0421* (2013.01); *G05B 9/03* (2013.01); *G05B 15/02* (2013.01); *G05B 2219/14014* (2013.01); *G06F 11/16* (2013.01); *G06F 11/202* (2013.01)

(58) Field of Classification Search
None
See application file for complete search history.

(56) References Cited

U.S. PATENT DOCUMENTS

| | | |
|---|---|---|
| 3,978,659 A | 9/1976 | Smith et al. |
| 4,029,952 A | 6/1977 | Giras et al. |
| 4,521,871 A | 6/1985 | Galdun et al. |
| 4,562,528 A | 12/1985 | Baba |
| 4,797,884 A | 1/1989 | Yalowitz et al. |
| 4,890,284 A | 12/1989 | Murphy et al. |
| 4,937,777 A | 6/1990 | Flood et al. |
| 5,128,943 A | 7/1992 | Tulpule et al. |
| 5,192,873 A | 3/1993 | Wrenbeck et al. |

(Continued)

FOREIGN PATENT DOCUMENTS

| | | |
|---|---|---|
| DE | 19814096 A1 | 10/1999 |
| EP | 2573629 A1 | 3/2013 |

(Continued)

OTHER PUBLICATIONS

European Search Report for European Patent Application No. 14165781.7 dated Nov. 3, 2014.

*Primary Examiner* — Qing Wu
(74) *Attorney, Agent, or Firm* — Carlson, Gaskey & Olds, P.C.

(57) ABSTRACT

A multi-channel control system includes at least a primary control microprocessor and a back-up control microprocessor operable to control a device. The primary control microprocessor and the back-up control microprocessor assert control over a controlled device according to a locally stored method of controlling a back-up microprocessor assumption of control of a device.

6 Claims, 6 Drawing Sheets

(56) References Cited

U.S. PATENT DOCUMENTS

| | | | |
|---|---|---|---|
| 5,274,554 A * | 12/1993 | Takats | G06F 11/1641 244/76 R |
| 5,279,107 A | 1/1994 | Meisner et al. | |
| 2011/0087343 A1 * | 4/2011 | Kamenetz | G05B 19/0428 700/82 |
| 2013/0076291 A1 | 3/2013 | Kamenetz et al. | |
| 2013/0079902 A1 | 3/2013 | Kamenetz et al. | |

FOREIGN PATENT DOCUMENTS

| | | |
|---|---|---|
| EP | 2573636 A2 | 3/2013 |
| EP | 2573933 A2 | 3/2013 |

* cited by examiner

MULTI-CHANNEL CONTROL SWITCHOVER LOGIC

TECHNICAL FIELD

The present disclosure relates to electrical controllers, and more particularly to an electronic control architecture integrating multiple control channels.

BACKGROUND OF THE INVENTION

Existing electronic controls systems typically utilize multi-channel primary controllers, and a back-up controller to control a device. Under normal fault-free conditions, the primary control controls the plant. The back-up controller assumes control when the primary controllers experience some threshold degree of damage or error that the primary controllers cannot recover from. For example, when both channels have a failure of their primary controllers. Another example is a channel-wide failure such as power supply failure in one channel simultaneous with the other channel's primary controller failing.

SUMMARY OF THE INVENTION

Disclosed is a method of controlling a primary microprocessor assumption of control of a device in a multi-channel control device including the steps of entering a control process in one of two possible control states, wherein the two possible control states are a primary microprocessor in-control state and a primary microprocessor not in-control state, evaluating a plurality of conditions dependent upon which of the possible control states is true, entering one of a plurality of actions based on the evaluating of the plurality of conditions, wherein the plurality of actions includes an is channel-in-control output signal false action, a take/keep control action, and a give-up control action, and performing an action in response to entering the one of the plurality of actions.

Also disclosed is a method of controlling a back-up microprocessor assumption of control of a device in a multi-channel control device including the steps of entering a control process in one of two possible control states, wherein the two possible control states are a back-up microprocessor in-control state and a back-up microprocessor not in-control state, evaluating a plurality of conditions dependent upon which of the possible control states is true, entering one of a plurality of actions based on the evaluating of the plurality of conditions, wherein the plurality of actions includes a take/keep control action and a give-up control action, and performing an action in response to entering the one of the plurality of actions.

Also disclosed is an electronic control configuration including at least a first primary control microprocessor and a first back-up control microprocessor operable to control a device, the first primary control microprocessor and the first back-up microprocessor being located in a first control channel, a second control channel including at least one control microprocessor operable to control the device, and each of the first primary control microprocessors and the first back-up control microprocessors being arranged as an independent equivalent control channel.

These and other features of the present invention can be best understood from the following specification and drawings, the following of which is a brief description.

DETAILED DESCRIPTION OF AN EMBODIMENT

Figure 1:
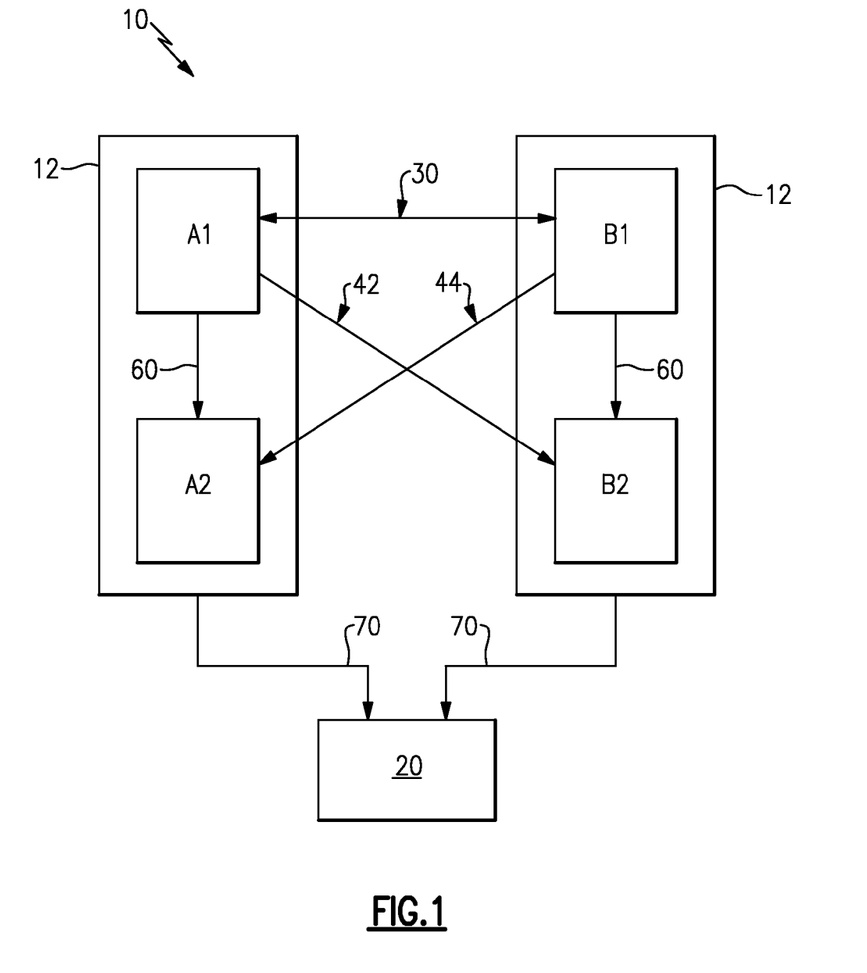
FIG. 1 illustrates an example multi-channel controller.

FIG. 1 schematically illustrates a multi-channel controller 10. The multi-channel controller 10 includes two primary control microprocessors A1, B1 and two back-up control microprocessors A2, B2. Each of the primary control microprocessors A1, B1 shares a mount 12 with a corresponding local secondary control microprocessor A2, B2. Each of the mounts 12 is considered a control channel. Alternate embodiments could use four identical control microprocessors A1, B1, A2, B2 or could locate each of the four control microprocessors A1, B1, A2, B2 on separate mounts 12. Each of the primary control microprocessors A1, B1 is connected to the other primary control microprocessor A1, B1 via a cross-channel data communications link and a channel-in-control signal 30. The channel-in-control signal 30 informs the other primary control microprocessor A1, B1 of the operational status of the primary control microprocessor A1, B1 and the corresponding secondary control microprocessor A2, B2. The channel-in-control signal 30 informs the other control microprocessors A1, B1, A2, B2 that the control microprocessor A1, B1 originating the channel-in-control signal is currently controlling the dual channel controlled device 20. The operational status of any of the control microprocessors A1, B1, A2, B2 is referred to as the control microprocessor's health, and when the control microprocessor ceases function, the control microprocessor is referred to as being in a failure state, or unhealthy.

Each of the primary control microprocessors A1, B1 also includes a channel health signal 42, 44 (alternately referred to as a Channel Good Remote signal) connecting the primary control microprocessor A1, B1 to a remote secondary control microprocessor A2, B2, with the secondary control microprocessor B2 being remote to the primary control microprocessor A1 and the secondary control microprocessor A2 being remote to the primary control microprocessor B1. A local channel health signal 60 (alternately referred to as a Channel Good Local signal) connects each of the primary control microprocessors A1, B1 with the corresponding local secondary control microprocessor A2, B2 and performs the same function as the remote channel health signals 42, 44. Each of the two groupings of control microprocessors A1, B1, A2, B2 is connected to the controlled device 20 via a device control signal 70. It is understood that each of the signal lines 30, 42, 44, 60, 70 illustrated in FIG. 1 can represent multiple physical signals connected to the control microprocessors A1, B1, A2, B2.

Figure 2:
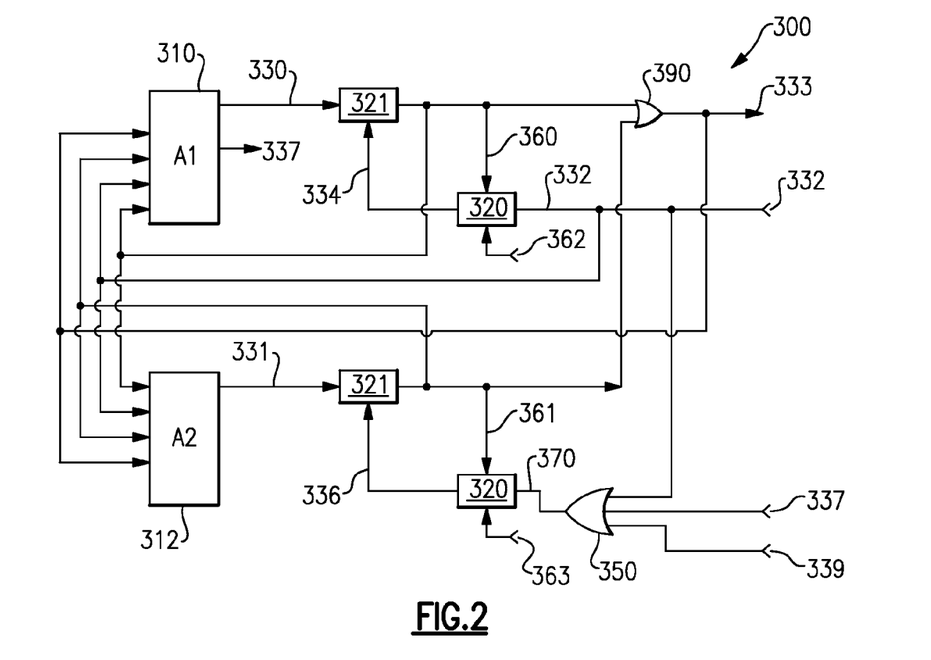
FIG. 2 illustrates a primary control microprocessor and a back-up control microprocessor in a single channel of the example multi-channel controller of FIG. 1.

FIG. 2 illustrates an exemplary control channel with control microprocessors A1 and A2, logic block 320, and the latching Boolean gate 321 in a control input configuration 300. Each of the control microprocessors A1, A2 has a control in-control request output 330, 331 that is passed to a standard latching Boolean gate 321 in each of the channels. Each of the latching Boolean gates 321 generates outputs referred to as control microprocessor in-control outputs. The control microprocessor in-control outputs serve as inputs to an OR gate 390. The output of the OR gate 390 provides a general channel-in-control output 333 that is passed to the other channel (not illustrated). Each logic block 320 has a clear latch output 334, 336 that resets latching Boolean gate 321 output to false.

The control input configuration 300 also includes a control microprocessor in-control logic block 320 that combines a control microprocessor A1 in-control output 360 or a control microprocessor A2 in-control output 361 of the current channel and a general channel-in-control output 332 of the other channel (not illustrated) into a clear latch output 334, 336. The control circuit corresponding to secondary control microprocessor A2 further includes an OR gate 350 that includes inputs of a local channel health signal 337 indicating the health of the primary control microprocessor A1 in the local channel A and a remote health signal 339 indicating the health of the primary control microprocessor B1 in the remote channel B. The OR gate 350 then outputs a high signal indicating that the secondary control microprocessor A2 should not exert control when at least one of the two control microprocessor health inputs 337, 339 indicates a healthy local/remote primary control microprocessor or the remote channel-in-control signal 332 indicates that one of the remote control microprocessors B1, B2 is in-control of the controlled device 20. The control microprocessor in-control logic block 320 then uses a logic circuit (illustrated in FIG. 3) to determine if the corresponding control microprocessor A1, A2 should exert control or should be prohibited from exerting control of the controlled device.

For redundancy, to prevent the primary control microprocessor A1, B1 and the secondary control microprocessor A2 B2 within the same control channel from attempting to be in-control simultaneously, key signals from the switchover logic are wrapped-around to both control microprocessors A1, A2. These include but are not limited to the outputs of latching Boolean gate 321 (A1 control microprocessor in-control 360 and A2 control microprocessor in-control 361), the channel-in-control signal 333 and the remote channel-in-control 332. In addition, these wraparound signals provide fault detection capability.

Figure 3:
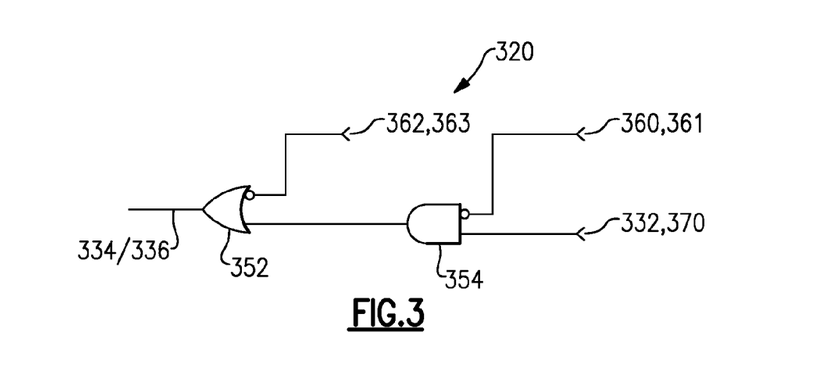
FIG. 3 illustrates a logic block for producing a channel-in-control signal.

FIG. 3 illustrates the logic circuit of logic block 320 in greater detail. The logic circuit 320 includes an AND gate 354 and an OR gate 352. The AND gate 354 accepts an input 332 corresponding to either the remote channel-in-control signal 332 for the logic block 320 corresponding to the primary control microprocessor A1, or an input 370 corresponding to the output of the OR gate 350 (illustrated in FIG. 2) for the back-up control microprocessor A2. The AND gate 354 also accepts, and inverts, an input 360, 361 from the A1 or A2 latching Boolean gate 321, which disables the clear latch output when control microprocessor A1 or A2 is already in-control. Thus, the AND gate 354 outputs a signal indicating that the corresponding control microprocessor A1, A2 is not allowed to take control of the controlled device 20 when input 370 indicates that a remote channel control microprocessor B1, B2 is in-control of the controlled device. Conversely, if a local control microprocessor A1, A2 is already in-control, the remote channel control microprocessor B1, B2 cannot take control away from the local control microprocessor A1, A2.

The output of the AND gate 354 is passed to an OR gate 352 that additionally accepts an inverted input 362, 363 corresponding to a health of the control microprocessor A1 or A2. The input 362, 363 can either originate from the control microprocessor A1, A2 or from independent health logic. If the input 362, 363 indicates that the control microprocessor A1, A2 is not healthy, the enable is set false and control is taken away from the control microprocessor A1, A2. Specifically, the OR gate combines the output of the AND gate 354 and the input 362 to generate a clear latch output that is capable of deactivating the A1 control microprocessor in-control or the A2 control microprocessor in-control outputs from logic block 321.

Figure 4:
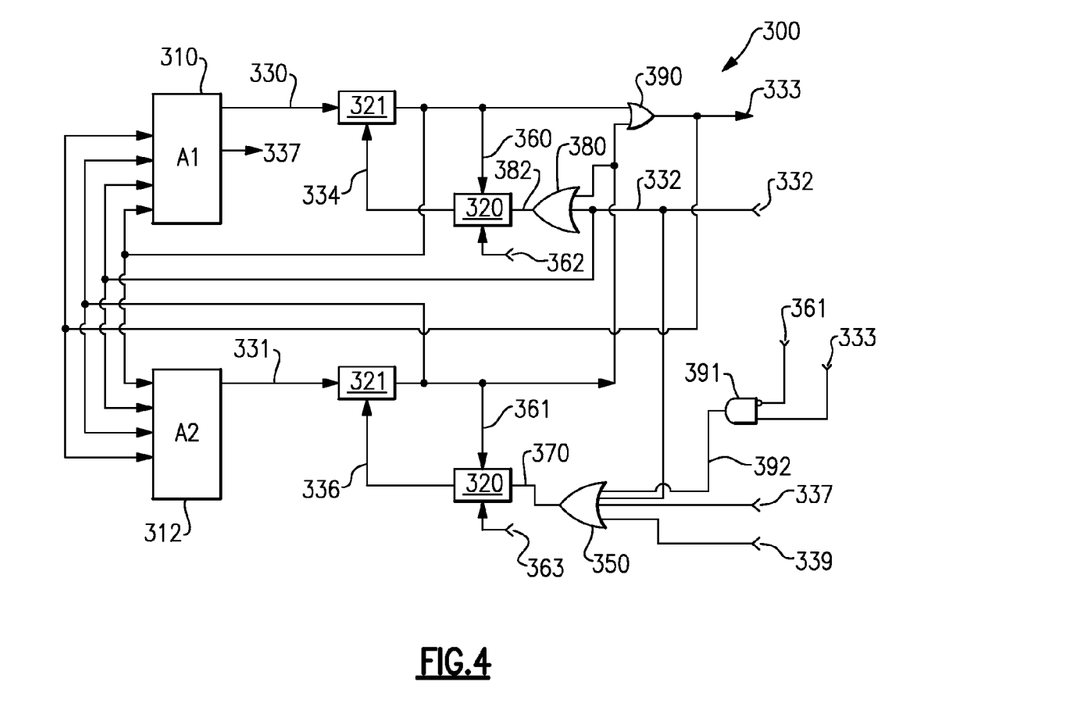
FIG. 4 illustrates an example primary control microprocessor and a back-up control microprocessor including a hardware lock logic system in a single channel of the example multi-channel controller of FIG. 1.

FIG. 4 illustrates the exemplary control channel with control microprocessors A1 and A2, logic block 320, and the latching Boolean gate 321 in a control input configuration 300 with the addition of an OR gate 380 and an AND gate 391. Each of the OR gate 380 and the AND gate 391 function together to create a hardware lock that locks out the primary control microprocessor A1 when the back-up control microprocessor A2 is in-control and locks out the back-up control microprocessor A2 when the primary control microprocessor A1 is in-control.

The OR gate 380 connects to an input of the logic block 320 corresponding to the primary control microprocessor A1, and provides an OR operation on the control microprocessor A2 in-control output 361 input and the general channel-in-control output 332 of the other channel B, with one input to the logic block 382 being the output of the OR gate 380 operation. In the illustrated example of FIG. 4, the OR gate output 382 replaces the direct input of the general channel-in-control output 332 to the logic block 320 corresponding to the primary control microprocessor A1.

The AND gate 391 receives a general channel-in-control signal 333 that is passed from the illustrated channel A to the other channel B as a first input, and an inverted control microprocessor A2 in-control output 361 as a second input. When the general channel-in-control signal 333 is true and the control microprocessor A2 in-control output 361 is false, the AND gate 391 outputs true on an AND gate output 392. The AND gate output 392 provides an additional input to the OR gate 350, which in turn provides the input 370 of the logic gate 320 corresponding to the back-up control microprocessor A2.

The additional input of the AND gate 391 alters the OR gate 350 output to be high when at least one of the two control microprocessor health inputs indicates a healthy control microprocessor, or the remote channel-in-control signal 332 indicates that one of the remote control microprocessors B1, B2 is in-control of the controlled device 20 or the general channel-in-control signal 333 indicates that the illustrated channel is in-control and the control microprocessor A2 in-control output 361 of the current channel indicates that the back-up control microprocessor A2 is not in-control. That is, the primary control microprocessor A1, is in-control while the back-up control microprocessor A2 is not in-control.

As described above the combined effect of the additional OR gate 380 and the additional AND gate 391 logic is to provide a hardware lockout that prevents the primary control microprocessor A1 of the illustrated channel from taking control when the back-up control microprocessor A2 of the illustrated channel is in-control and vice versa.

Figure 5:
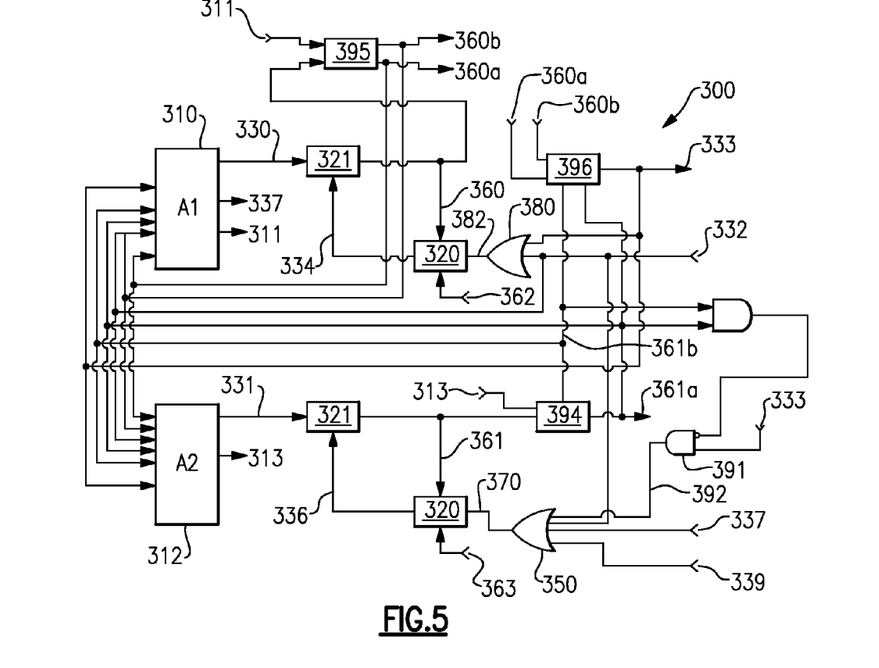
FIG. 5 illustrates the example primary control microprocessor and a back-up control microprocessor of FIG. 4 including a redundant channel-in-control logic system.

FIG. 5 illustrates the exemplary control channel A of FIG. 4, with the further addition of a primary back-up control redundancy system that protects the channel-in-control circuit 300 from a single point failure that could inadvertently allow the back-up control microprocessor A2 to take control when it is not supposed to.

The illustrated control circuit 300 of FIG. 5 includes the addition of a redundant control microprocessor A2 in-control output logic block 394 and a redundant control microprocessor A1 in-control output logic block 395. Each of the redundant control microprocessor in-control logic blocks 394, 395 includes two redundant microprocessor in-control outputs 360a, 360b, 361a, 361b, with the outputs 360a, 360b, 361a, 361b being provided to a redundant channel-in-control logic block 396. Each of the redundant logic blocks 394, 395, 396 imparts a redundancy on the logical operations, thereby ensuring that any single element failing within the logic circuitry does not lead to the back-up microprocessor A2 asserting control when the back-up microprocessor A2 is not supposed to take control.

In the example of FIG. 5, the input 361 to the AND gate 391 of FIG. 4, is replaced with both of the redundant outputs 361a, 361b of the logic block 394 illustrated in FIG. 5.

Figure 6:
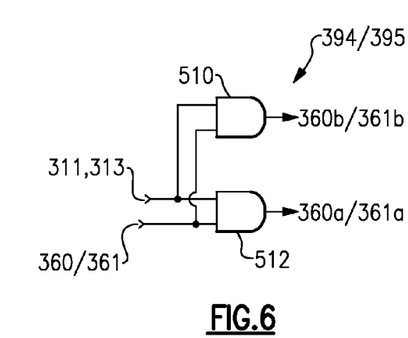
FIG. 6 illustrates a first redundant microprocessor in-control logic block for use in the example primary control microprocessor and back-up control microprocessor of FIG. 5.

FIG. 6 illustrates a detailed example redundant control microprocessor A2, A1 in-control output logic block 394/395. The example logic block 394/395 accepts a drive enabled signal from the corresponding microprocessor A1, A2 as an input 311/313. The drive enabled signals 311/313 indicate as true when the corresponding microprocessor is enabled and is in-control. Similarly, the drive enabled signals 311/313 indicate as false, when the corresponding microprocessor is not enabled. The logic block 394/395 also accepts the control microprocessor A1, A2 in-control output 360/361 of the corresponding microprocessor A1, A2 as an input. The inputs 311/313, 360/361 are passed to a pair of redundantly arranged AND gates 510, 512 each of which outputs as true when both inputs indicate as true. The resulting output of the logic block 394/395 is a pair of redundant outputs 360a/361a, 360b/361b.

Figure 7:
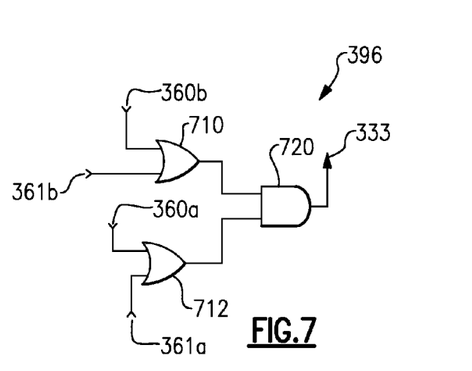
FIG. 7 illustrates a second redundant channel-in-control logic block for use in the example primary control microprocessor and back-up microprocessor of FIG. 5.

FIG. 7, illustrates the redundant channel-in-control logic block 396 of FIG. 5 in greater detail. The redundant channel-in-control logic block 396 includes a first OR gate 710 and a second OR gate 712, each of which outputs into an input of an AND gate 720. The first OR gate 710 receives a first pair of redundant microprocessor in-control signals 360b, 361b from the redundant control microprocessor in-control logic blocks 394, 395. Similarly, the second OR gate receives a second pair of redundant microprocessor in-control signals 360a, 360b, from the redundant microprocessor in-control logic blocks 394, 395. Each of the OR gates, 710, 712 outputs as true when either of the inputs 360a/361a, 360b/361b to the OR gate 710, 712 indicates that the corresponding microprocessor A1, A2 is in-control. The AND gate 720, then combines the outputs of each of the OR gates 710, 712 and outputs a channel-in-control signal 333, when both the OR gates 710, 712 output as true.

By combining the redundant microprocessor in-control logic blocks 394/395 and the redundant channel-in-control logic block 396, the redundant channel-in-control logic block 396 outputs a signal indicating that the illustrated channel is in-control even if one of the logic elements in the redundancy includes a fault such that one of the four signals (360a, 360b, 361a, 361b) is failed True. In this way, the back-up microprocessor A2 is prevented from taking control in a situation where the microprocessors A1, A2 are functioning properly and a fault has occurred within the microprocessor in-control signal logic.

Referring again to FIGS. 1-5, some example embodiments include a resistive barrier between the microprocessors A1, A2, B1, B2 within a single channel. The resistive barrier electrically isolates the channel-in-control circuitry of the back-up microprocessor A2, B2 from the primary microprocessors A1, B1 and prevents a fault in the back-up controller A2, B2 from propagating upwards into the primary controller A1, A2 of the same channel.

Figure 8:
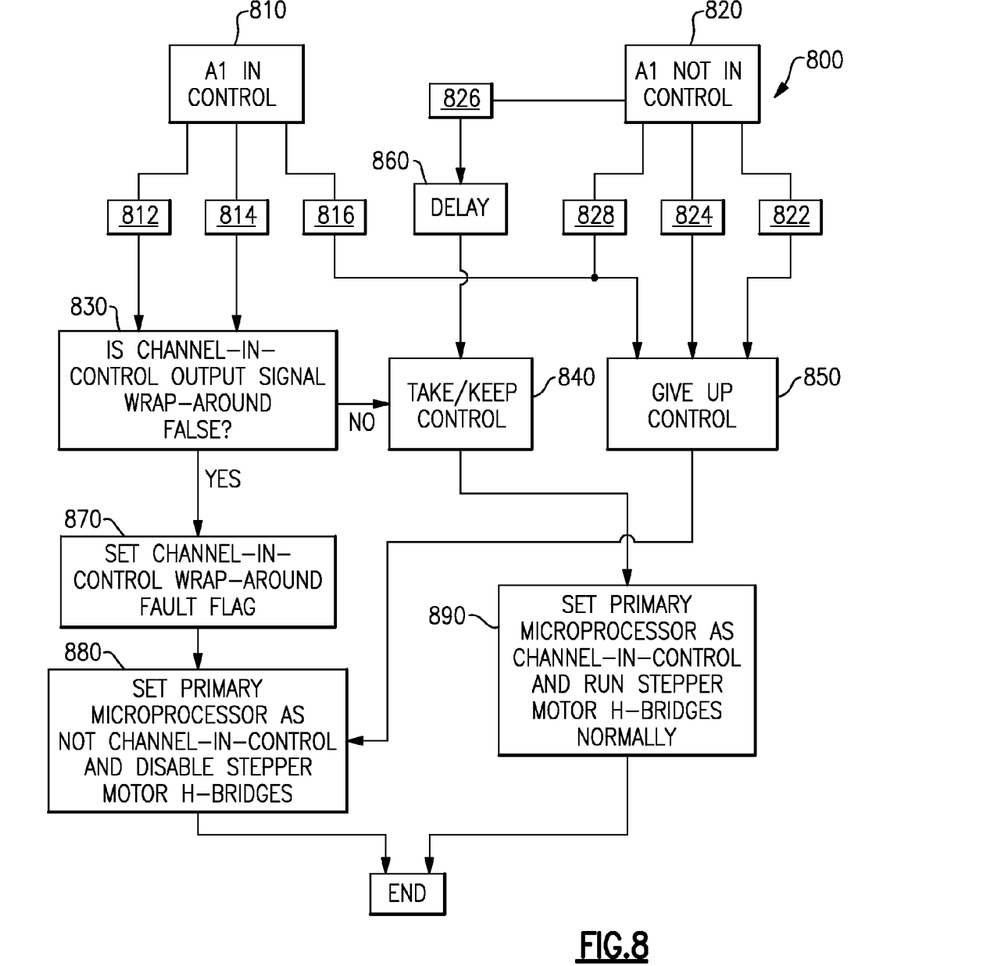
FIG. 8 illustrates an assumption of control logic state chart for a primary microprocessor controller.

FIG. 8 illustrates a state transition chart for a primary microprocessor A1 control assumption process 800 in either of the examples of FIGS. 4 and 5 where the controlled device is an H-bridge stepper motor. The state transition chart describes a software process for determining if the primary microprocessor A1 in the local channel should take control, and implementing the assumption of control. At start of the program, the microprocessor A1 can be in either one of two states: An A1 in-control state 810 or an A1 not in-control state 820. If the microprocessor A1 is in the A1 in-control state 810, then the microprocessor A1 will check the microprocessor A2 in-control wraparound signals 361a, 361b and set a fault flag if True. The next action depends on a set of prioritized conditions 812, 814, 816.

The highest priority condition 812 is when local channel primary control microprocessor A1 is healthier than a remote channel primary control microprocessor B1, then the software proceeds to a control action 830. If the cross-channel data link is not valid, the local channel primary control microprocessor A1 uses the last health value received from B1. If the highest priority condition is not met, then the software checks condition 814 as the second highest priority condition. The second highest priority condition 814 is met when both channels A and B (See FIG. 1) are in-control and the local channel is A. Although both channels A, B are not designed to take control simultaneously, it can happen due to unforeseen circumstances such as hardware faults. In this event, channel A is a preferred channel for breaking the conflict. The second highest priority condition 814 is also met when the local primary microprocessor controller has a better health than the latest determined remote primary microprocessor controller health. If the cross-channel data link is not valid, A1 uses the last health value received from B1. When the second highest priority condition 814 is met, the software proceeds to control action 830. At control action 830, A1 evaluates 333, the channel-in-control output to the remote channel and checks for a True condition. If True, the software proceeds to Take/Keep Control Action 840. When neither of the higher priority conditions 812, 814 are met, the lowest priority condition 816 is met and the software moves to a give-up control action 850.

Beginning in the A1 not in-control state 820 leads to four possible conditions 822, 824, 826, 828. The highest priority condition, 822 is met when the remote channel B is in-control as indicated by an in-control from remote signal 332 or a flag from the remote channel B via a cross channel data link indicating the remote channel is in-control. The highest priority condition 822 is also met if the local primary microprocessor A1 has had control within a set time period. In one example the set time period is 48 milliseconds. When the highest priority condition 822 is met, the software proceeds to the give-up control action 850. If the highest priority condition 822 is not met, the software checks the second highest priority condition 824. The second highest priority condition 824 is met when the back-up microprocessor A2 is in-control, and the remote channel B is not in-control. When the second highest priority condition 824 is met, and the highest priority condition 822 is not met, the software proceeds to the give-up control action 850. When neither the first highest, nor the second highest, priority conditions 822, 824 are met, the software checks the third highest condition 826. The third highest condition 826 is met when the local primary microprocessor controller has a better health than the latest determined remote primary microprocessor controller health. If the cross-channel data link is not valid, A1 uses the last health value received from B1. When this condition 826 is met, the software proceeds to a delay action 860, where further action is delayed for a set period of time. After the delay, the software proceeds to the second take/keep control action 840. In one example the delay time period is 10 microseconds.

The lowest priority condition 828 is met when none of the higher priority conditions 822, 824 and 826 are met. When the lowest priority condition 928 is met, the software proceeds to the give-up control action 850.

Once in the first take/keep control action 840, the software proceeds to set a wrap around in-control flag as false. Once in the second take/keep control action 840, the software proceeds to set the primary microprocessor A1 as in-control in a set primary microprocessor as in-control action 890.

Once in the give-up control action 850, the software proceeds to disable the corresponding stepper motor H-bridge and set the primary controller as not in-control in the set primary microprocessor A1 as not in-control action 880.

Returning back to control action 830, A1 evaluates the channel-in-control output to the remote channel and checks for a False condition. If False, the software proceeds to set Channel-In-control Wraparound Fault Flag to True at the set Channel-In-Control Wraparound Fault Flag step 870. The software then disables a corresponding stepper motor H-bridge and sets the primary controller A1 as not in-control in a set primary microprocessor A1 as not in-control action 880. If True, the software proceed to the take/keep control action 840.

From both the set primary microprocessor A1 as not in-control action 880 and the set primary microprocessor as in-control action 890 the control assumption software process ends.

Figure 9:
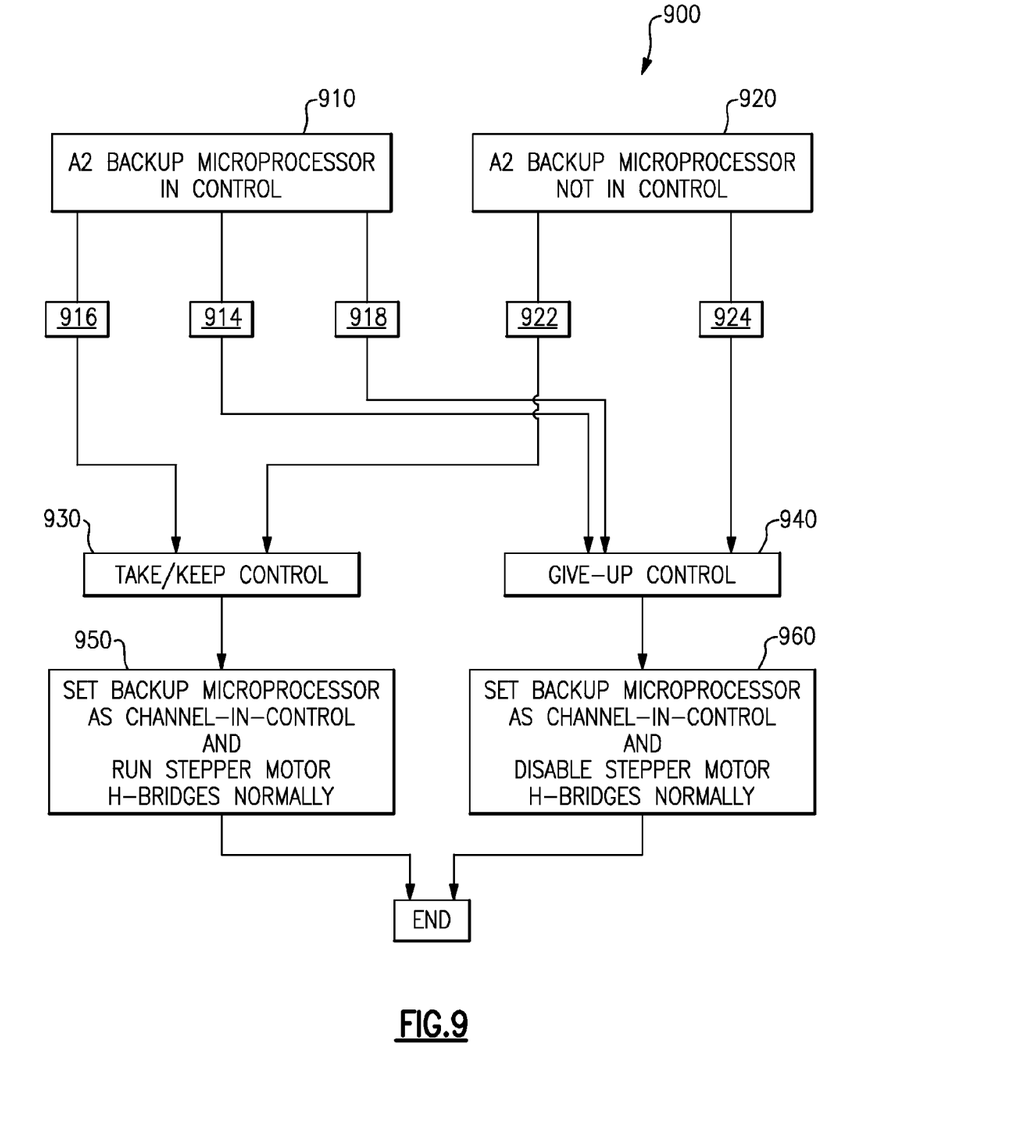
FIG. 9 illustrates an assumption of control logic state chart for a back-up microprocessor controller.

FIG. 9 illustrates a state transition chart 900 for a back-up microprocessor A1 control assumption process in either of the examples of FIGS. 4 and 5 where the controlled device is an H-bridge stepper motor. The microprocessor software begins in one of two possible states: Either the microprocessor A2 is in a Back-up microprocessor in-control state 910 or the microprocessor A2 is in a back-up microprocessor not in-control state 920. From the back-up microprocessor in-control state 910, the software evaluates whether three possible conditions 914, 916, 918 are met, and evaluates how to proceed based on those possible conditions.

The highest priority condition 914 is met when either the back-up microprocessor A2 is not healthy enough to control or a local hardware wraparound fault exists within the local channel A such that a wraparound indicates that A2 is not in-control or should not be in-control. When the highest priority condition 914 is met the software proceeds to the give-up control action 940. When the highest priority condition 914 is not met, the software evaluates the second highest priority condition 916.

The second highest priority condition 916 is met when either both channels are in-control and the channel designation is A, or the remote channel is not in-control. When the second highest priority condition 916 is met and the first highest priority condition 914 is not met, the software proceeds to a take/keep control action 930.

The lowest priority condition 918 is met when none of the higher priority conditions 914, 916 are met. When the lowest priority condition 918 is met, the software proceeds to the give-up control action 940.

If the software begins in the back-up microprocessor is in-control state 920 there exist two possible conditions 922, 924. The highest priority condition 922 is met when all the following are True: the remote channel B is not channel-in-control, the Remote Channel Good signal is False (the remote primary microprocessor control B1 in channel B is not healthy), the Local Channel Good signal is False (the local primary microprocessor control A1 in channel A is not healthy), there is no critical fault in the back-up microprocessor A2, the back-up microprocessor A2 is not disabled, the time since power-up is greater than a startup period and the back-up microprocessor has not been in-control for a set time period. In one example the startup period is two seconds. The startup period allows the primary microprocessors A1, B1 a chance to take control before the back-up microprocessors A2, B2 do so. That is, on power-up, the preferred controls are the primary as opposed to the back-up microprocessor controls assuming the primary microprocessor controls are healthy. In another example the set time period is 48 milliseconds. The set time periods gives the remote back-up microprocessor control B2 an opportunity to take control. If the remote back-up microprocessor B2 does not take control within the set time period, the remote primary microprocessor B1 has the option to take back control if it is healthy enough to do so. When the highest priority condition 922 is met, the software proceeds to the take/keep control action 930.

When the highest priority condition 922 is not met, the software proceeds to the give-up control action 940.

From the take/keep control action 930, the software runs the stepper motor H-bridges normally, controlled by the back-up microprocessor A2 in a run stepper motor H-bridges normally action 950. Similarly, from the give-up control action 940, the software disables the back-up microprocessor A2 H-bridge controls in a disable stepper motor H-bridges action 960.

From either the run stepper motor H-bridges normally action 950 or the disable stepper motor H-bridges action 960, the back-up microprocessor A1 control assumption process ends.

While each of the above control assumption processes 800, 900 are illustrated with regards to a primary Channel A, and a secondary channel B, it is understood that they could be adapted according to known methods to incorporate additional channels beyond two channels or to identify any channel as the channel-in-control channel. Furthermore, while the above described control assumption processes 800, 900 are described in terms of a software control scheme, it is understood that they could similarly be implemented using hardware logic.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of controlling a primary microprocessor assumption of control of a device in a multi-channel control device comprising the steps of:
    entering a control process in one of two possible control states, wherein said two possible control states are a primary microprocessor in-control state and a primary microprocessor not in-control state;
    evaluating a plurality of conditions dependent upon which of said possible control states is true by evaluating a first set of conditions when said control process is in the primary microprocessor in-control state and a second set of conditions when said control process is in the primary microprocessor not in-control state;

said second set of conditions includes at least four conditions and corresponds to the primary microprocessor not in-control state;

a first condition of the at least four conditions is met when a remote channel is channel-in-control, a remote primary microprocessor controller is in-control, or the primary microprocessor controller has been in-control within a set time period and wherein said first condition of the at least four conditions has a highest priority;

a second condition of the at least four conditions is met when a back-up microprocessor controller is in-control and the remote channel is not channel-in-control, wherein the second condition of the at least four conditions has a second highest priority;

a third condition of the at least four conditions is met when the primary microprocessor controller has a better health than a latest determined remote primary microprocessor controller health, wherein the third condition of the at least four conditions has a third highest priority;

a fourth condition of the at least four conditions is met when each of the first, second, and third condition of the at least four conditions is not met;

entering one of a plurality of actions based on said evaluating of said plurality of conditions, wherein said plurality of actions includes an is channel-in-control output signal wrap-around false check, a take/keep control action, and a give-up control action; and performing an action in response to entering said one of said plurality of actions.

2. The method of claim 1, wherein said method enters the give-up control action when said first, second, or fourth condition of the at least four conditions is met and wherein said method undergoes a delay and enters the take/keep control action when the third condition of the at least four conditions is met.

3. A method of controlling a primary microprocessor assumption of control of a device in a multi-channel control device comprising the steps of:

entering a control process in one of two possible control states, wherein said two possible control states are a primary microprocessor in-control state and a primary microprocessor not in-control state;

evaluating a plurality of conditions dependent upon which of said possible control states is true;

entering one of a plurality of actions based on said evaluating of said plurality of conditions, wherein said plurality of actions includes an is channel-in-control output signal wrap-around false check, a take/keep control action, and a give-up control action; and performing an action in response to entering said one of said plurality of actions, said action comprising at least one of setting a channel-in-control output wrap-around fault flag as true and setting the primary microprocessor as not in-control in response to said is channel-in-control output signal wrap-around false check returning positive.

4. The method of claim 3, wherein the step of performing an action in response to entering said one of said plurality of actions further comprises setting the primary microprocessor as in-control in response to entering the take/keep control action.

5. The method of claim 3, wherein the step of performing an action in response to entering said one of said plurality of actions further comprises setting the primary microprocessor as not in-control in response to entering the give-up control action.

6. The method of claim 3, further comprising the step of prioritizing each condition within said plurality of conditions such that when a higher priority condition is met, a corresponding action is taken regardless of whether any lower priority conditions are met.

* * * * *